Jan. 19, 1960  B. BARENYI  2,921,812
REINFORCED FLOOR AND GIRDER CONSTRUCTION FOR MOTOR VEHICLES
Original Filed Oct. 7, 1952  5 Sheets-Sheet 1

Inventor

BELA BARENYI

By Dicke and Craig
Attorneys

Jan. 19, 1960   B. BARENYI   2,921,812
REINFORCED FLOOR AND GIRDER CONSTRUCTION FOR MOTOR VEHICLES
Original Filed Oct. 7, 1952   5 Sheets-Sheet 2

Inventor
BELA BARENYI
By Dicke and Craig
Attorneys

Inventor
BELA BARENYI
By Dicke and Craig
Attorneys

Jan. 19, 1960        B. BARENYI        2,921,812
REINFORCED FLOOR AND GIRDER CONSTRUCTION FOR MOTOR VEHICLES
Original Filed Oct. 7, 1952        5 Sheets-Sheet 4

Inventor

BELA BARENYI

By Dicke and Craig
Attorneys

Jan. 19, 1960     B. BARENYI     2,921,812
REINFORCED FLOOR AND GIRDER CONSTRUCTION FOR MOTOR VEHICLES
Original Filed Oct. 7, 1952     5 Sheets-Sheet 5
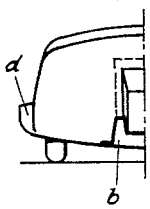
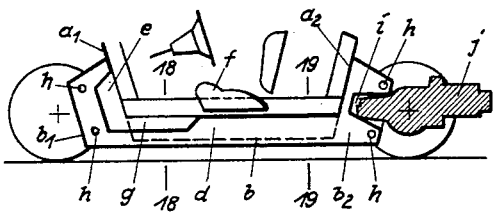
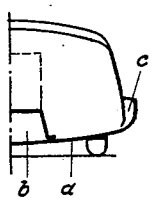
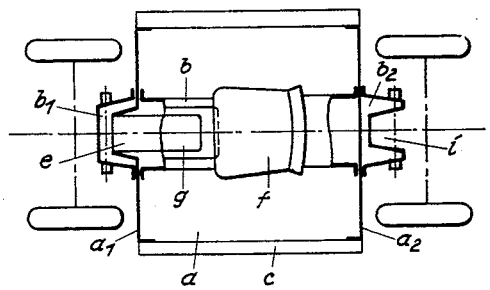
 
 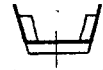
 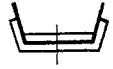
 
 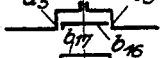
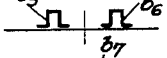 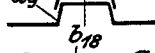
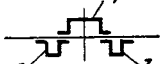 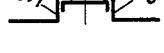
Inventor
Bela Barenyi
By Richard Padden
attorneys United States Patent Office 2,921,812
Patented Jan. 19, 1960

2,921,812

REINFORCED FLOOR AND GIRDER CONSTRUCTION FOR MOTOR VEHICLES

Béla Barényi, Stuttgart-Rohr, Germany, assignor to Daimler-Benz Aktiengesellschaft, Stuttgart-Unterturkheim, Germany Original application October 7, 1952, Serial No. 313,559, now Patent No. 2,777,728, dated January 15, 1957. Divided and this application July 7, 1955, Serial No. 521,315

Claims priority, application Germany September 23, 1949

13 Claims. (Cl. 296—28)

The present application is a divisional application of my copending application Serial No. 313,559, filed October 7, 1952, entitled "Motor Vehicle Accessible by Means of a Pivotal Cap," now U.S. Patent 2,777,728, which claimed the right of priority of certain German applications filed in Germany on September 23, 1949, said parent application Serial No. 313,559 being a continuation-in-part application of my following applications, all of which have become abandoned:

Application Serial No. 186,156, filed September 22, 1950, entitled "Chassis, Particularly of Motor Vehicles,"

Application Serial No. 186,157, filed September 22, 1950, entitled "Motor Car," and Application Serial No. 190,761, filed October 18, 1950, entitled "Motor Vehicle."

The subject matter of my prior copending application Serial No. 139,609, filed January 20, 1950, entitled "Reinforced Floor Plate for Body of Sectional Automobile," now Patent No. 2,710,222, is also incorporated by reference into this application.

My invention relates to a motor vehicle, and more particularly to an automobile of the coupe type having a streamlined body encasing the wheels.

Streamlined bodies of known vehicles of that type are so designed that their largest longitudinal and transverse dimensions are located substantially in the plane of the floor, that is to say at a level determined by the required road clearance. Such a body, however, is unsatisfactory for a number of reasons. Difficulties are encountered in accommodating the various units, such as the engine block, the axle transmission etc. An efficient utilization of the space enclosed by the body is difficult. Also the aero-dynamic properties are unsatisfactory.

It is one of the objects of my invention to avoid such disadvantages and to create a body which combines a minimum of air resistance with the possibility of efficiently utilizing its space for the accommodation of the driving unit, the fuel tank etc. More particularly, it is an object of my invention to provide for a body in which the engine block, the transmission units, the electrical equipment, the spare tire, the fuel tank, a trunk space etc. may be arranged and located in a practical compact manner and in which the passenger space has its greatest width at elbow level, so as to afford a maximum of comfort and convenience to the driver and the passengers.

Further objects are to eliminate the necessity of providing a closed car with doors; to reduce the height of the vehicle; to produce a small car of the coupe type which may be composed of cellular elements; and to create a small and inexpensive closed car adapted to accommodate either the driver alone or one or two passengers seated at the side of the driver; and to provide a closed car which while having a comparatively high chassis of a rugged structure may nevertheless have a low floor and a low roof, thereby limiting the total height to a minimum. In order to obtain such objects, I design the upper section of the closed body as a cap which being hinged to the body may be swung to the opened position thereof, thereby permitting the driver or passenger to enter or leave the car. The hinge extends preferably transversely of the body either in front of or behind the passenger space, i.e. near the front end or near the rear end of the body and is preferably carried by a side bar.

The liftable cap may be provided with windows or the like and I prefer to make the cap in part or in toto of a transparent material, for instance of "Plexiglass."

A further object of the invention is a side wall comprising chassis girders having a cross-section of comparatively high vertical dimensions, whereby a rugged and rigid structure is obtained without adversely affecting the accessibility of the passenger space or without requiring an increase of the height of the vehicle or a necessity to provide doors.

In order to facilitate the operation of swinging the cap to the opened position thereof, the weight of the cap may be compensated for entirely or in part by a spring-controlled mechanism including torsional springs, traction springs, or pressure springs, a Nuremberg scissors or the like. Such mechanism may be so spring-controlled as to first produce a limited lifting force at the commencement of the lifting operation and an increasing lifting force when the cap approaches a median position which lifting force decreases towards the end of the lifting movement. In this manner the mechanism may be so controlled as to cause the cap, as soon as the driver has lifted it a little, to automatically spring into its opened position. In order to facilitate the lifting of the cap, the latter may be provided with handles, such handles serving at the same time to unlock the cap. Handle bars may serve as fender bars for the protection of the vehicle at the same time.

Other objects of my invention are to build up the body of separate individual sections or cells; to provide improved means for connecting such sections, the latter being so designed that the front sections and the rear sections may be readily attached to and detached from the central section; to provide for cushioning means inserted between the different sections for the purpose of absorbing shocks and vibrations; and to provide for a possibility of installing parts of indentical shape at both ends of the central section, so as to reduce the number of spare parts to be kept in stock and so as to reduce the cost of manufacture of the car.

A further object of the invention is to provide a suitable mounting and an elastic suspension of an axle and/or the driving aggregate of the vehicle.

Further objects of my invention are to provide a chassis or floor assembly of vehicle bodies, and more particularly a body assembly comprising a floor panel having one or two slanting extensions and at least one longitudinal re-inforcing girder, said assembly being simple in design and having a low weight and a rugged structure.

Other objects of my invention are to provide such a structure of said assembly as to allow a maximum of space and a low center of gravity.

Preferably I place a longitudinal central girder in toto or in part on top of the floor panel, thus securing the advantage that, with a given road clearance, the floor panel and consequently the center of gravity are located on the lowest possible level. In addition to the central girder I may provide lateral longitudinal girders preferably confining the body space on its outside. A high rigidity will result from making the cross sectional profile of the lateral girders higher than that of the central girder. The unit comprising the floor panel and the central girder re-inforcing the same both provided with upwardly slanting extensions may constitute a floor unit carrying a separate body or may constitute part of a self-supporting body.

Moreover, the re-inforcing girder may be manufactured as a hollow girder independently of the floor panel or may be made as a channel beam closed by the floor panel so as to constitute a hollow girder.

According to another feature of my invention the floor panel which may form part of the self-supporting body of the vehicle is comprised of two sections abutting the central girder laterally and rigidly connected therewith in any suitable manner, for instance, by means of longitudinal vertical flanges welded to the girder. My invention results in a simple structure inexpensive to manufacture and capable of easy assembly. When applied to bodies composed of cellular units, the slanting extensions of the central girder which are preferably symmetrical with respect to a transverse vertical central plane may serve to attach the end cells, i.e., the body end sections, and to suspend the wheels.

For the purpose of attaining such and other objects I have provided novel and improved means which will be described hereinafter with reference to a preferred embodiment of my invention illustrated in the accompanying drawings and the features of novelty will be pointed out in the claims.

In the drawings:

Fig. 16 is a vertical longitudinal section of the chassis of a motor vehicle according to my invention;

Fig. 17 is a plan view of Fig. 16 partly in section;

Fig. 18 is one half of the section taken along line 18—18 of Fig. 16;

Fig. 19 is half of the section taken along line 19—19 of Fig. 16;

Figures 20 to 28 are diagrammatic longitudinal sections through the chassis or floor assembly illustrating nine different embodiments of my invention; and Figs. 29 to 40 are diagrammatic cross-sections taken through the floor panel and the central girder, said figures illustrating twelve different embodiments of my invention.

The body A of the car shown in each of the figures comprises a front section $a$ enclosing the front wheels, a rear section $b$ enclosing the rear wheels and a central section $c$ connecting the sections $a$ and $b$. The section $c$ may include lateral longitudinal girders having comparatively large vertical dimensions and a floor panel connected therewith and reinforced by suitable means. More particularly, the body section $c$ of the vehicle may be constructed as disclosed in my patent application, S.N. 186,156, filed September 22, 1950, entitled "Chassis, Particularly of Motor Vehicles," now abandoned, and corresponding to an application filed in Germany on September 23, 1949, disclosing the combination of a floor panel having slanting front and rear extensions and a central longitudinal girder having slanting front and rear extensions united with the floor panel, this patent application S.N. 186,156 being copending with my parent application S.N. 313,559, now U.S. Patent 2,777,728, which was a continuation-in-part application of said patent application S.N. 186,156.

The liftable cap B comprises side wall sections $d$, an upper bridge section $e$ connecting the sections $d$ and located substantially above the dash-board of the vehicle, and a hood $f$ confining the passenger's space at the top and consisting, for instance, or a transparent material. If desired, the entire cap including the elements $d$, $e$ and $f$ may be made of the same material.

Figure 1:
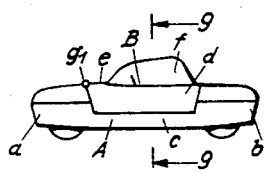
Fig. 1 is an elevation of a coupe provided with a liftable cap hinged to the front section of the body, said cap being shown in closed position.
Figure 2:
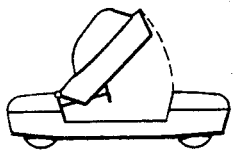
Fig. 2 is a view of the same vehicle with the cap in lifted position.

In the embodiment illustrated in the Figs. 1 and 2 the section $c$ of the cap is hinged to the rear edge of the front section $a$, the hinge being indicated at $g_1$.

Figure 3:
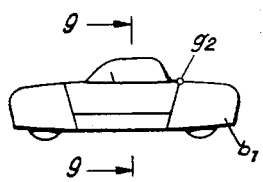
Fig. 3 is an elevation of a car similar to that of Fig. 1, but differing by the cap being hinged to the rear section of the body.
Figure 4:
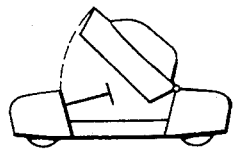
Fig. 4 shows the vehicle of Fig. 3 with the cap lifted.

In the embodiment shown in Figs. 3 and 4 the hinge $g_2$ of the cap is located at the front edge of the rear section $b_1$ of the body. Hence, the cap of the vehicles shown in Figs. 1 and 3 may be swung to the opened position thereof as shown in Figs. 2 and 4. In lieu of a single hinge, two co-axially arranged hinges may be provided on either side of the body as will be readily understood. The hinge is located substantially on the level of the lower edge of the windshield portion of the hood $f$.

Figure 5:
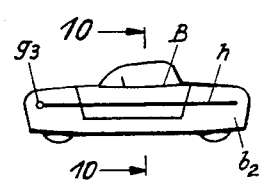
Fig. 5 is an elevation of a coupe-type car with a cap carried by fender bars hinged to the front section of the body.
Figure 6:
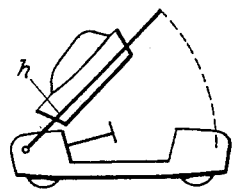
Fig. 6 shows the same car with the cap lifted.
Figure 7:
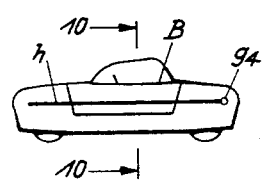
Fig. 7 shows a coupe-type car with a cap carried by fender bars hinged to the rear section of the body.

The embodiment illustrated in Figs. 5 to 8 differs from the embodiments shown in Figs. 1 to 4 by the position and arrangement of the hinge. The cap B is rigidly connected with lateral bars $h$ extending lengthwise of the body at the outside thereof, one bar at either side, such bars being pivotally connected either to the front end of the body as shown in Figs. 5 and 6 at $g_3$ or to the rear end of the body as shown at $g_4$ in Figs. 7 and 8. Owing to their lateral position, the bars may serve the triple function of guiding the cap in its lifting motion, of protecting the body when the cap is closed, and of serving as a handle for the purpose of lifting the cap from the outside.

The springs serving to carry part of the weight of the cap thus facilitating the lifting thereof, may be arranged coaxially with the hinge or hinges or off-set therefrom. They may act on levers suitably connected with the cap or with the bars $h$. If the spring-control mechanism includes Nuremberg scissors, the latter are preferably mounted at the end of the cap opposite to the hinge, for instance between the rear body section $b_2$ and the rear end of the bars $h$ or the rear edge of the cap in the embodiment shown in Figs. 5 and 6.

When the cap is unlocked and swung into opened position, it affords easy access to the seat or seats. As stated heretofore the spring mechanism may be so designed that once the cap has been slightly lifted, it will swing upwards into the fully opened position automatically and will remain in such position.

Figure 8:
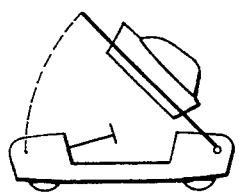
Fig. 8 shows the same car with the cap lifted.

A comparison of Figs. 2 and 4 with Figs. 6 and 8 will show that the provision of the supporting bars $h$ permits of a reduction of the angle of the swinging motion of the cap. In order to facilitate the lifting of the cap from the inside, the cap may be provided with suitable inner handles.

The hinges are preferably so designed that they permit of easy disassembly of the cap by removal of the hinge bolts, thus affording a possibility of converting the closed coupe into an open touring car. Alternatively, the connection between the bars $h$ and the cap B may be so designed as to permit of easy detachment. In that case the bars may be left in place upon removal of the cap, so that they might serve to protect the body and to form railings safeguarding the passengers or goods to be transported from accidentally falling out of the car.

Figure 9:
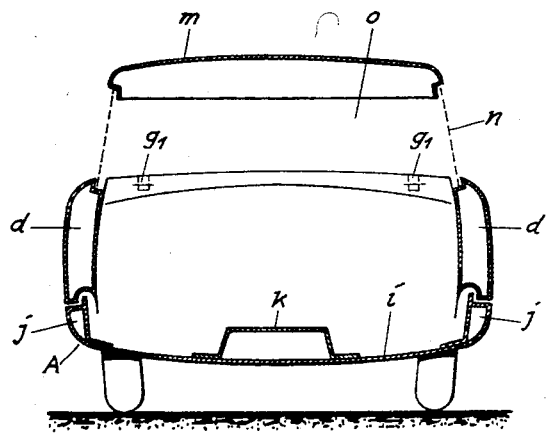
Fig. 9 is a cross-section taken along line 9—9 of Figs. 1 and 3.
Figure 10:
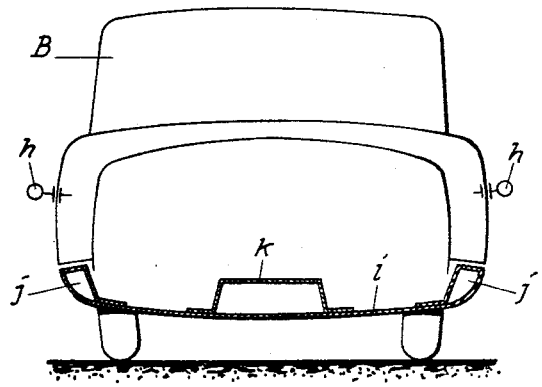
Fig. 10 is a cross-section taken along line 10—10 of Figs. 5 and 7.
Figure 11:
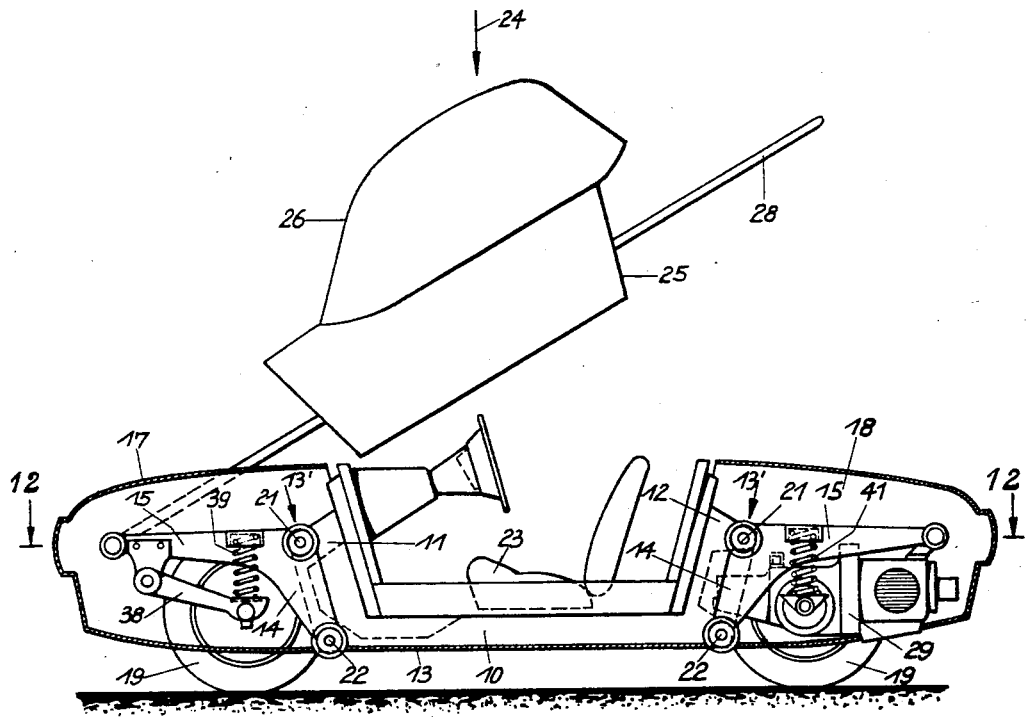
Fig. 11 is an elevation of my novel motor car, partly shown in section along line 11—11 of Figure 12.

In Figs. 9 and 10 I have shown cross-sections of two different embodiments of the invention on an enlarged scale. As shown therein the body A includes a floor panel $i$ integral with a longitudinal central girder $k$ and two longitudinal lateral girders $j$.

An upwardly slanting extension of the panel $i$ confining the passenger space in the front thereof carries the hinges $g_1$ shown in Fig. 9 to which the cap B is attached. This cap is composed of the side wall portions $d$, of a roof portion $m$ and of window portions $n$ and $o$ of transparent material rigidly connecting the roof portion $m$ with the side wall portions $d$. The window portion $o$ shown in Fig. 9 constitutes the windshield.

As shown in Fig. 10, the cap B may be formed by an integral member of a transparent plastic attached to the bars $h$.

The body of the motor car illustrated in Figs. 11–15 comprises a central section, a front section and a rear section. First, I shall described the central body section.

It consists of a central longitudinal hollow floor sill 10 provided with upwardly slanting ends 11 and 12 and of a floor panel 13 (Fig. 15) which likewise has upwardly slanting end portions so arranged as to be co-extensive with the sill 10, 11 and 12 and is rigidly connected therewith by welding, riveting, or the like. Moreover, the central body section is re-inforced by lateral longitudinal hollow girders 14 (Fig. 15) which may be integral with the floor panel and may extend between and abut against the upwardly slanting front and rear portions thereof. A more detailed description of the central body section of the motor car is deemed dispensable herein, since it has been described in my patent application S.N. 186,157, entitled "Motor Car," filed September 22, 1950, now abandoned, which was based on a corresponding patent application filed in the German Federal Republic on September 23, 1949, and which was copending with my aforementioned parent application S.N. 313,559, now U.S. Patent No. 2,777,728, which was a continuation-in-part application thereof. The subject matter of such copending specification shall be considered as a part of the present specification.

The end sections of the body are preferably of identical shape, so as to be interchangeable. For the purpose of attaching each of such end sections to the central section of the body, I have provided a bracket of bell crank shape comprising a pair of spaced bracket members designated generally by reference numeral 13', one such member being mounted on either side of the upwardly slanting ends 11 and 12 of the central sill. Thus, there are four such bell crank members 13', two at either end of the central body section. Each of said bell crank members 13' has a downwardly extending arm 14 attached to the upwardly slanting portion 11 or 12 respectively of the floor sill and a horizontal arm 15 extending in a direction away from the central body section. Preferably, the four bell crank members 13' are identical in shape, so as to be interchangeable. The ends of the horizontal arms 15 of the bell crank members 13' are rigid, preferably integral, with a transverse bar 16. The end body section 17 or 18 respectively, which is formed by a sheet metal shell encasing the bracket assembly 13', 16 and the wheels 19 is fixed to the ends of the transverse bar 16, the latter extending through suitable holes 20 provided in the side walls of such shell 17 or 18 respectively. It will be noted from Figs. 11 and 12 that the two end body sections 17 and 18 thus constitute wheel housings for the wheels 19, the axis of the latter extending beneath the horizontal bracket arms 15.

The wheels may be suspended by any suitable means. In the Figs. 11 and 12, the front wheels are guided on the front brackets 13' by arms 38 and sprung by helical springs 39, while the rear wheels are supported by swinging half axles 40 and sprung by helical springs 41 against the rear brackets 13'.

For the purpose of attaching the bracket members 13' to the central sill 10, 11, 12, the latter is preferably provided with laterally projecting upper studs 21 and lower studs 22 on which the downwardly extending arms 14 of the bell cranks 13' are mounted. In order to absorb vibrations, rubber cushions may be interposed between the studs 21, 22 and the bracket members 13'. Because of the slanting position of the sill end portions 11 and 12, the studs 21 will be located somewhat outward of the coordinated studs 22; they are situated substantially on the same level as the bars 16.

The central body section having slanting front and rear walls constituted by the end portions of the floor panel and having slanting side walls constituted by the girders 14 is of tub-shape. It confines the passenger space and includes the driver's seat 23. Preferably, such passenger space may be covered by a cap 24 which is integral with downwardly extending lateral side wall portions 25 and may be made of a plastic material being at least partly transparent, so as to provide for a windshield 26 and for lateral windows 27. A more detailed description of that cap is not deemed necessary, since it was more fully described in my aforementioned earlier application S.N. 186,157, now abandoned, of which the aforementioned parent application S.N. 313,559, now Patent 2,777,728, was a continuation-in-part application.

Figure 12:
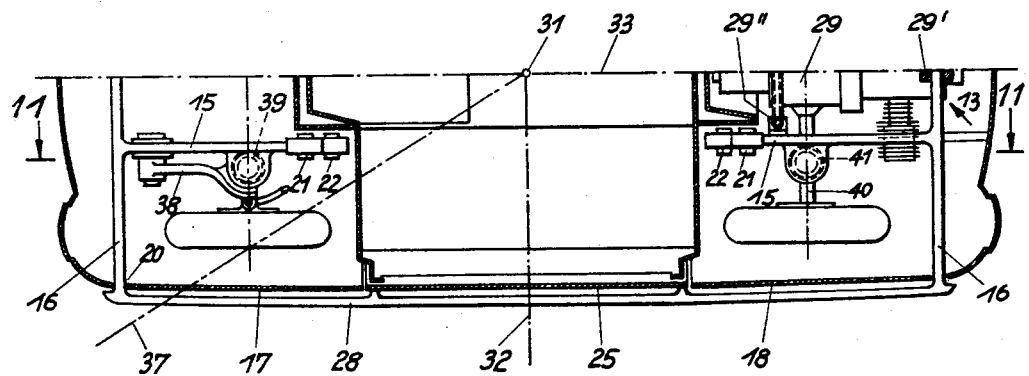
Fig. 12 is a plan view of the motor car shown in Fig. 1, partly in section along line 12—12 of Figure 11.

Lengthwise of the body formed by the central section and the end sections 17 and 18 there extends on either side thereof a fender bar 28 which is rigidly attached to the respective side wall portion 25 of cap 24 and has its front end pivoted on the respective end of bar 16 projecting out of the front body portion 17 as shown in Fig. 12. Hence, the fender bars 28 may be swung upwardly to lift the cap 24 into the opened position shown in Fig. 11 so as to afford access to the driver's seat. When the cap is in its closed position shown in full lines in Figs. 13 and 14 in which it covers the passenger space, the bars 28 extend horizontally.

The engine block 29 is preferably mounted within the rear body section 18 being attached by suitable means for instance in three points 29', 29'' with the interposition of rubber buffers, to the rear bracket members 13' and being adapted to drive the semi-axles 40 carrying the rear wheels 19, each semi-axle being guided for instance for pivotal movement about a central longitudinal axis of the vehicle in a manner well known in the art.

By the mentioned suspending means for the wheels the weight of the body and of the engine block will be transferred to the four wheels 19. Since such wheel suspending means are well known in the art, a detailed description thereof is not believed necessary herein.

The bracket members 13' are held in position on the studs 21 and 22 by nuts (not shown) or other readily detachable means affording a possibility of easily detaching the two end body sections from the central body section.

Preferably, the body formed by the central section, the front section and the rear section has a shape which is characterized by substantially oval contours of all of its vertical longitudinal cross-sections and of all of its vertical transverse cross-sections. In referring to the body of the vehicle, however, I do not include the cap 24 thereof. More particularly, the body is so shaped as to have a greatest width and length at the level indicated at 30 in Figs. 13 and 14, such level coinciding with the plane 12—12 shown in Fig. 11, which is tangential to the top of the wheels 19. A comparison of Figs. 13, 14 and 15 will show that because of the rounded contours of the body, all of its vertical cross-sections extending through the vertical axis 31, shown in Fig. 12 will have an oval contour, the axis 31 being the intersection of the transverse central plane 32 and of the longitudinal central plane 33. Thus, the vertical section taken along line 37, Fig. 12, for instance will be oval.

Moreover, it will appear that the contours of the body are symmetrical with respect to either plane 32 or 33. All of the oval vertical cross-sections of the body have their diameters of maximum length located substantially within the common plane 30. This plane is substantially on the same level as the elbows of the driver seated on the driver's seat 23 or of the passengers sitting beside the driver. Thus, a maximum of comfort and space will be afforded to the passengers.

Lamps 34 constituting the head-lights, or the tail-lights respectively, may be provided in the end sections 17 and 18, such lamps being preferably located at the level of plane 30.

At the same level, the fender bars 28 are preferably located so as to protect the body from abrasion and other damage.

Figure 13:
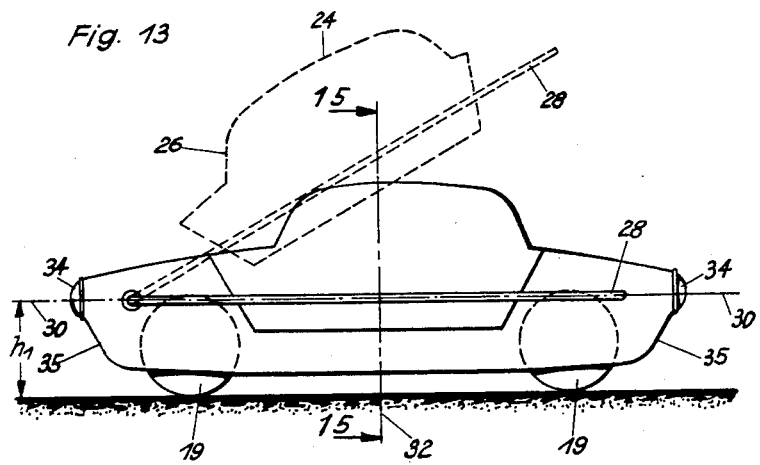
Fig. 13 is an elevation of the car shown on a smaller scale.
Figure 14:
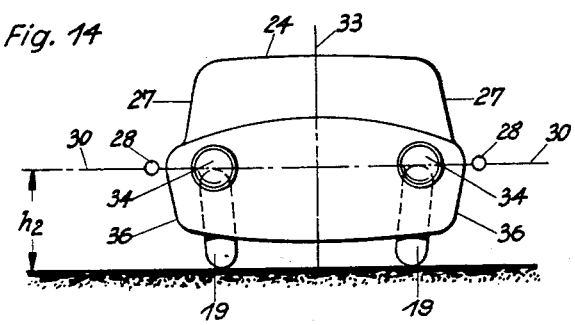
Fig. 14 is a rear view of the vehicle.
Figure 15:
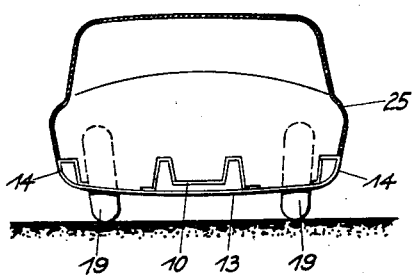
Fig. 15 is a cross-section taken substantially along line 15—15 of Fig. 13.

While I have referred to the contours of the vertical cross-sections extending longitudinally and transversely of the body as being of oval shape, such ovals are not truly elliptical but have flattened portions indicated in Fig. 13 at 35 and in Fig. 14 at 36, the contour having its smallest radius of curvature substantially at or near the plane 30.

From the foregoing description of my invention it will appear that I have provided a novel vehicle composed of three sections in which the two end sections are connected to the central section by means of brackets serving to transfer the weight of the central section and that of the end sections as well as the weight of the engine block and other units to the wheels of the vehicle, such brackets being of bell crank shape having horizontal arms extending above and beyond the axis of the front wheels, or the axis of the rear wheels respectively; that by so organizing the various elements of the body, the assembly of the vehicle is considerably facilitated and an opportunity is offered for the interposition of vibration-damping rubber cushions between the different elements; that the front body section and its supporting structure has a shape identical with that of the rear body section and its supporting structure, whereby the production and assembly is simplified and the number of spare parts reduced; that ample space is provided for the accommodation of the engine block, the spare tire, the fuel tank, luggage etc. and that the aerodynamic resistance will be a minimum, since the air current flowing past the body will be smoothly guided resulting in a minimum of turbulence.

Figs. 16 to 19 show the central cellular element of a vehicle of the cellular design. The central cell or central body section or the chassis portion thereof comprises substantially the floor panel $a$ extending substantially over the whole width of the vehicle and provided with upwardly slanting front and rear extensions $a_1$ and $a_2$, a central re-inforcing girder $b$ likewise having slanting extensions indicated at $b_1$ and $b_2$ and two lateral longitudinal re-inforcing girders $c$ and $d$ shown in Figs. 18, 19 and 20.

The central re-inforcing girder $b$ is constituted by a channel beam of U-shaped cross-section which is completed by the bottom panel $a$ and by the slanting extensions $a_1$ and $a_2$ thereof to form a hollow girder having a closed cross-sectional profile. The median section of the central longitudinal girder will thus be located within the interior space of the body, i.e. above the floor, whereas the slanting extensions $b_1$ and $b_2$ of the girder are preferably located on the outside of the slanting floor panel extensions $a_1$, and $a_2$ respectively. Moreover, the arrangement is such that the slanting floor panel extensions are located in close proximity to the front wheels, and the rear wheels respectively. In this manner substantially the entire space available between the pair of front wheels and the pair of rear wheels is rendered available for the accommodation of the passengers or for loading space. The slanting extensions $b_1$ and $b_2$ of the central re-inforcing girder, however, project into the space between the front wheels, and into the space between the rear wheels respectively, the hollow cross-sectional profile of the girder and of its slanting extensions having comparatively large vertical dimensions. Moreover, it will appear from Figs. 16 and 17 that the slanting front extensions of both the floor panel and the central girder bulge forwardly to provide for a forward extension $e$ of the interior space of the body accommodating the feet of a passenger seated on the seat $f$ located in the central longitudinal vertical plane of the vehicle. More particularly, the slanting extension $a_1$ of the floor panel bulges forwardly into the U-shaped cross-section of the girder extension $b_1$. To further enlarge such foot space $e$ the top wall of the girder $b$ has a central downward bulge $g$ as shown in Figs. 16 and 17 extending forwardly from the seat $f$ of the driver. To permit the attachment of a forward body cell and of a rear body cell the girder extensions $b_1$ and $b_2$ are provided with bosses $h$ adapted to accommodate connecting bolts. The slanting rear extension $b_2$ of the central girder has a rear wall formed with a forward bulge shown in Fig. 16 at $i$ accommodating part of the driving unit, for instance the change-speed gear casing of a rear engine assembly $j$. The lateral re-inforcing girders $c$ and $d$ are preferably likewise made hollow and, in order to increase the ruggedness of the body, are given larger vertical dimensions than the central girder $b$, the latter serving at the same time to support the seat or seats for the passengers.

Preferably, the re-inforcing girders and the floor panel are rigidly connected with each other, for instance by welding or spot welding. The horizontal section of the central girder and the two slanting extensions thereof may be pre-fabricated as separate parts which are mounted on the floor panel and its extensions from both sides thereof and are then connected with each other and with the floor panel. However, I may compose the floor panel of different sections which are subsequently assembled and welded to one another and to the central girder. As stated hereinbefore the floor panel and the re-inforcing girder may form parts of a chassis or may constitute a self-supporting body.

The ends of the lateral girders $c$ and $d$ may abut against the slanting floor panel extensions $a_1$ and $a_2$ and be welded thereto or, alternatively, may extend outside of and in contact with vertical flanges provided on the slanting extensions $a_1$ and $a_2$ as indicated in Fig. 17. Moreover, the girders $c$ and $d$ may be made integral with the floor panel $a$ being formed by bending the marginal portions of the floor panel to tubular structures as indicated in Figs. 18 and 19.

Figs. 20 to 28 illustrate, in a diagrammatic fashion, various embodiments differing from each other by the mode of the co-ordination of the floor panel and the central girder and the slanting extensions of both. In these figures the thick line represents a longitudinal vertical section through the floor panel and its slanting extensions while the thin line depicts the contour of the girder. Thus it will appear that Fig. 20 illustrates a body assembly in which the central girder and both of its slanting extensions are located on top of the floor panel and on the inside of the extensions thereof, respectively. In Fig. 21 the central girder and the slanting extensions thereof are located beneath the floor panel or outside of the slanting extensions thereof, respectively. In the body shown in Fig. 22 the girder and the slanting extensions thereof are arranged substantially co-extensive with the floor panel so as to project above and beneath the same and its slanting extensions. Figs. 23, 24 and 25 illustrate arrangements in which the horizontal section of the girder is located on one side of the floor panel while the slanting extensions of the girder are located on the opposite side thereof. Thus Fig. 23 shows substantially the arrangement illustrated in Figs. 16 to 19 in which the central girder is located above the level of the floor panel while the slanting extensions of the girder are located on the outside of the slanting panel extensions. I prefer this arrangement since it results in the best utilization of the available space and in the location of the center of gravity at a low level.

Fig. 25 illustrates a similar arrangement in which the horizontal section of the central girder extends partly above and partly below the level of the floor panel. Therefore, the spaciousness of the body will be less adversely affected by the girder. However, this advantage is purchased at the cost of a slightly higher location of the center of gravity.

In the embodiment illustrated in Fig. 24 the slanting extensions of the girder are located on the inside of the floor panel extensions, whereas the horizontal section of the girder is located below the level of the floor panel.

The arrangement shown in Fig. 26 is similar to that of Fig. 24 differing therefrom in that the horizontal girder section extends above and below the level of the floor panel.

The arrangement shown in Fig. 28 is similar to that of Fig. 24 differing therefrom in that the slanting girder extensions extend partly inside of and partly outside of the slanting floor panel extensions.

The embodiment shown in Fig. 27 is similar to that of Fig. 28. However, the horizontal section of the girder extends above the level of the floor panel.

Figs. 29 to 40 illustrate a variety of designs of the central girder $b$ and its co-ordination to the floor panel $a$, the embodiment shown in Fig. 29 corresponding to that shown in Figs. 16 to 19.

In Fig. 30 I have shown a central girder constituted by two channel beams $b_3$ and $b_4$ mounted on the floor panel $a$ from the opposite sides thereof, whereby it will extend partly above and partly below the level of the floor panel as indicated in Figs. 22, 25 and 26.

In the design shown in Fig. 31 the central girder is formed by two parallel spaced longitudinal channel beams $b_5$ and $b_6$ of inverted U-shaped cross-section rigidly connected with one another by the floor panel, thus constituting in effect substantially a single unitary girder. I wish it to be clearly understood that where the term "central girder" is used in the claims, such term is intended to cover two slighly spaced rigidly connected beams. It will be noted that the interior space of the channel beams $b_5$ and $b_6$ is closed by the floor panel, the beams constituting box-shaped elements.

The floor panel shown in Fig. 32 is re-inforced by a central girder constituted by an inverted channel beam $b_7$ placed on top of the floor panel and by two spaced parallel channel beams $b_8$ and $b_9$ placed on the floor panel from below, the three channel beams being rigidly welded to the floor panel so as to constitute in effect a single girder.

In the embodiment shown in Fig. 33 the central girder $b_{10}$ is formed by an inverted channel beam which is integral with the lateral floor panel section $a$ and may be formed with the latter by a single sheet metal plate suitably bent.

In the embodiment shown in Fig. 34 the re-inforcing girder $b_{11}$ has been pre-fabricated, prior to the attachment to the floor panel sections $a_3$ and $a_4$ as a box-shaped beam having a closed cross-sectional profile. The panel sections $a_3$ and $a_4$ are subsequently rigidly connected with and preferably welded to the beam $b_{11}$. They may carry parts of the side walls of the body. Similarly, in all of the other embodiments the floor panel or the lateral longitudinal girders rigidly connected or integral therewith may be attached to parts of the side walls as indicated in Figs. 18 and 19.

In the embodiment illustrated in Fig. 35 the central re-inforcing girder is simply formed by adjoining flanges $b_{12}$ of the floor panel sections $a_3$ and $a_4$, whereas in the embodiment of Fig. 37 two lateral angle bars $b_{14}$ and $b_{15}$ are so provided as to constitute two hollow beams.

In the embodiment shown in Fig. 38, the central girder is formed by two adjoining off-set marginal portions $a_5$ and $a_6$ of the floor panel sections and by a plate $b_{16}$ constituting a closed box-shaped beam with the portions $a_5$ and $a_6$.

In the embodiment shown in Fig. 39 the floor panel is formed by a sheet metal plate bent in the manner described hereinabove with reference to Fig. 33 and the central girder thus formed is further re-inforced by the arrangement on top thereof of a channel bar $b_{17}$ constituting a hollow box-shaped beam together with the central part of the floor panel.

In the embodiment shown in Fig. 40 the central girder is similar to that shown in Fig. 33, but differs therefrom by its composition of separate flanged floor panel sections $a_7$ and $a_8$, subsequently connected by a sheet metal strip $b_{18}$ welded thereto.

The cross-sectional shapes of the extensions $b_1$ and $b_2$ of the central girder may be similar to or different from the cross-sectional shape of the horizontal girder section $b$. Thus, the horizontal section of the girder may have a closed profile, whereas the slanting extensions thereof may have an open profile. Moreover, the lateral longitudinal girders $c$ and $d$ may be omitted.

While I have described my invention with reference to preferred embodiments thereof, I wish it to be clearly understood that the same is not limited to the details thereof but is capable of numerous modifications within the scope of the appended claims.

What I claim is:

1. In a motor vehicle having wheel suspension means, the combination comprising a central body section having a central longitudinal hollow floor sill provided with upwardly slanting ends and a floor panel substantially co-extensive and rigidly connected therewith, a pair of spaced bracket members of bell-crank shape mounted on one of said upwardly slanting ends of said floor sill at the side surfaces thereof extending in the longitudinal direction of the vehicle, and each of said members having a downwardly extending arm attached to said upwardly slanting end of said floor sill and a forwardly extending arm adapted to support thereon the wheel suspension means of the vehicle.

2. In a motor vehicle, the combination according to claim 1, further comprising another pair of spaced bracket members mounted on the other of said upwardly slanting ends of said floor sill at the side surfaces thereof extending in the longitudinal direction of the vehicle, said second-mentioned bracket members being of the same shape as said first-mentioned bracket members.

3. In a motor vehicle, the combination according to claim 1, further comprising means including rubber buffers for elastically connecting said downwardly extending arms to said upwardly slanting end of said floor sill.

4. In a motor vehicle having a plurality of wheels with wheel suspension means for said wheels, the combination comprising a central body section having a central longitudinal hollow floor sill of substantial width and depth and provided with at least one upwardly slanting end including side surfaces extending essentially in the longitudinal direction of the vehicle and a floor panel substantially co-extensive and rigidly connected therewith to thereby reinforce said floor panel by said central longitudinal hollow floor sill, said upwardly slanting end of said hollow floor sill including means secured to the said side surfaces thereof for supporting thereon the wheel suspension for said wheels.

5. In a vehicle the combination comprising a central longitudinal floor girder of channel-shaped sheet metal, said girder having an upwardly slanting forward extension located between the front wheels of said vehicle, said extension being likewise of channel shape and adapted to carry wheel suspending means, a floor panel having a slanting forward extension and being co-extensive with said girder and welded thereto, said forward panel extension being located on said girder extension so as to close the hollow thereof and bulging into said channel-shaped girder extension, said floor girder being mounted on top of said floor panel so as to constitute a hollow beam therewith, at least one seat mounted on top of said girder, the top wall of said girder bulging downwardly between said seat and said forward extension.

6. In a motor vehicle, the combination comprising a central body section having a central longitudinal hollow floor sill provided with upwardly slanting ends and a floor panel substantially co-extensive and rigidly connected therewith, a pair of spaced bracket members of bell crank shape mounted on either side of one of said upwardly slanting ends, each of said members having a downwardly extending arm attached to said upwardly slanting end of said floor sill and a forwardly extending arm, a transverse bar carried by the ends of the forwardly extending arms of said members, and an end body section formed by a sheet metal shell carried by the ends of said bar and encasing said pair of members.

7. The combination set forth in claim 6 comprising transverse bolts for attaching each of said downwardly extending arms to said upwardly slanting end of said floor sill.

8. The combination set forth in claim 6 comprising resilient cushioning means for attaching each of said downwardly extending arms to said upwardly slanting end of said floor sill.

9. In a multi-cellular vehicle having a plurality of separately made cells and provided with wheel suspending means the combination comprising a hollow longitudinal floor girder having upwardly slanting extensions adapted to carry said wheel suspending means, the front extension being located between the front wheels of the vehicle and the rear extensions being located between the rear wheels of the vehicle, and a floor panel rigid with said girder and having forward and rearward panel extensions located on the inside of said girder extensions and rigidly connected therewith.

10. In a multi-cellular vehicle having a plurality of separately made cells and provided with wheel suspending means the combination comprising a hollow longitudinal floor girder having upwardly slanting extensions adapted to carry said wheel suspending means, the front extension being located between the front wheels of the vehicle and the rear extensions being located between the rear wheels of the vehicle, and a floor panel rigid with said girder and located on top thereof.

11. In a multi-cellular vehicle having a plurality of separately made cells and provided with wheel suspending means the combination comprising a hollow longitudinal floor girder having upwardly slanting extensions adapted to carry said wheel suspending means, the front extension being located between and extending above the top level of the front wheels of the vehicle and the rear extensions being located between and extending above the top level of the rear wheels of the vehicle, and a floor panel rigid with said girder and located on top thereof and having forward and rearward panel extensions located on the inside of said girder extensions and rigidly united therewith.

12. In a multi-cellular vehicle having a plurality of separately made cells and provided with wheel suspending means the combination comprising a central longitudinal floor girder of channel-shaped sheet metal, said girder having an upwardly slanting rearward extension located between the rear wheels of said vehicle, said extension being likewise of channel shape having flange and web portions, a floor panel having a slanting rearward extension and being co-extensive with said girder and welded thereto, said panel extension being located on said girder extension and welded to the flange portions thereof so as to close the hollow confined by the web and flange portions, the lower rear wall of said girder extension bulging forwardly and being adapted to carry a wheel suspending and driving unit.

13. In a multi-cellular vehicle having a plurality of separately made cells and provided with wheel suspending means the combination comprising a floor panel having upwardly slanted forward and rearward extensions and outwardly projecting supporting portions adapted to carry wheel suspending means, a longitudinal central channelled sheet metal beam having its downwardly extending flange portions welded to said floor panel, channelled sheet metal members mounted beneath said panel extensions and having its web portions welded thereto, said members constituting extensions of said beam being rigidly connected therewith.

References Cited in the file of this patent

UNITED STATES PATENTS

| | | |
|---|---|---|
| 1,189,284 | Nelson | July 4, 1916 |
| 1,953,515 | Smith | Apr. 3, 1934 |
| 2,092,507 | Haltenberger | Sept. 7, 1937 |
| 2,356,008 | Schafer | Aug. 15, 1944 |
| 2,577,836 | Willson | Dec. 11, 1951 |
| 2,710,222 | Barenyi | June 7, 1955 |
| 2,777,728 | Barenyi | Jan. 15, 1957 |

FOREIGN PATENTS

| | | |
|---|---|---|
| 601,189 | Germany | Aug. 10, 1934 |
| 626,345 | Germany | Feb. 24, 1936 |
| 476,100 | Great Britain | Dec. 1, 1937 |
| 550,603 | Great Britain | Jan. 15, 1943 |

OTHER REFERENCES

Ser. No. 368,684, Barenyi et al. (A.P.C.), published May 25, 1943.